US007331246B2

(12) United States Patent
Escoe et al.

(10) Patent No.: US 7,331,246 B2
(45) Date of Patent: Feb. 19, 2008

(54) MECHANICAL TORQUE WRENCH WITH AN ELECTRONIC SENSOR AND DISPLAY DEVICE

(75) Inventors: T. Kenneth Escoe, Randallstown, MD (US); Muniswamappa Anjanappa, Ellicott city, MD (US); Awad Aly Gharib, Cockeysville, MD (US); Xia Chen, Columbia, MD (US)

(73) Assignee: Easco Hand Tools, Inc., Simsbury, CT (US)

( * ) Notice: Subject to any disclaimer, the term of this patent is extended or adjusted under 35 U.S.C. 154(b) by 17 days.

(21) Appl. No.: 11/486,753

(22) Filed: Jul. 14, 2006

(65) Prior Publication Data

US 2007/0119268 A1 May 31, 2007

Related U.S. Application Data

(60) Provisional application No. 60/700,208, filed on Jul. 18, 2005.

(51) Int. Cl.
*B25B 23/14* (2006.01)
*G01L 5/24* (2006.01)

(52) U.S. Cl. .................................................. 73/862.21

(58) Field of Classification Search ............. 73/862.21, 73/862.08
See application file for complete search history.

(56) References Cited

U.S. PATENT DOCUMENTS 2,830,450 A * 4/1958 Knudsen .................. 73/862.26
4,091,664 A * 5/1978 Zerver ...................... 73/862.21
4,257,263 A 3/1981 Herrgen
4,300,413 A * 11/1981 Garofalo ........................ 81/62
4,397,196 A 8/1983 Lemelson
4,558,601 A 12/1985 Stasiek et al.
4,641,538 A 2/1987 Heyraud
4,643,030 A 2/1987 Becker et al.
5,315,501 A 5/1994 Whitehouse
5,537,877 A 7/1996 Hsu
5,589,644 A 12/1996 Becker et al.
6,070,506 A 6/2000 Becker
6,119,562 A 9/2000 Jenkins
6,167,788 B1 1/2001 Schonberger et al.
6,276,243 B1 8/2001 Jenkins (Continued)

*Primary Examiner*—Michael Cygan
*Assistant Examiner*—Octavia Davis
(74) *Attorney, Agent, or Firm*—Nelson Mullins Riley & Scarborough, LLP

(57) ABSTRACT

A mechanical torque wrench including a wrench body defining an elongated interior compartment and a wrench head including a bar extending therefrom being pivotally secured to a first end of the wrench body. A hand grip located on a second end of the wrench body and a set spring is disposed within the wrench body. A pawl is disposed between the bar and the set spring. Rotation of a dial screw in a first direction compresses the set spring and rotation in a second direction allows expansion of the set spring. A set ring is operatively connected to the dial screw and rotatable relative to the wrench body. A resistive element is coupled to the dial screw and produces an output signal that depends on a position of the dial screw relative to the resistive element. A processor converts the output signal into an equivalent torque value for display on a user interface. Application of a torque greater than the equivalent torque value to a workpiece causes the wrench head to pivot relative to the wrench body about the pivot joint.

19 Claims, 10 Drawing Sheets

U.S. PATENT DOCUMENTS

| | | | | |
|---|---|---|---|---|
| 6,345,436 | B1 | 2/2002 | Codrington | |
| 6,463,834 | B2 * | 10/2002 | Kemp et al. | 81/483 |
| 6,526,853 | B2 | 3/2003 | Jenkins | |
| 6,698,298 | B2 | 3/2004 | Tsuji et al. | |
| 6,968,759 | B2 | 11/2005 | Becker et al. | |
| 6,981,436 | B2 | 1/2006 | Becker et al. | |
| 7,000,508 | B2 | 2/2006 | Li et al. | |
| 7,047,849 | B2 | 5/2006 | Lai | |
| 7,082,865 | B2 | 8/2006 | Reynertson, Jr. | |
| 7,082,866 | B2 | 8/2006 | Becker | |
| 7,089,834 | B2 | 8/2006 | Reynertson et al. | |
| 2002/0170395 | A1 | 11/2002 | Wang et al. | |
| 2002/0178876 | A1 | 12/2002 | Wang et al. | |
| 2004/0255733 | A1 | 12/2004 | Reynertson, Jr. | |
| 2005/0061119 | A1 | 3/2005 | Becker | |
| 2005/0072278 | A1 | 4/2005 | Cutler et al. | |
| 2005/0092143 | A1 | 5/2005 | Lehnert et al. | |
| 2005/0223856 | A1 | 10/2005 | Reynertson et al. | |
| 2006/0027049 | A1 * | 2/2006 | Arnold | 81/60 |

* cited by examiner

MECHANICAL TORQUE WRENCH WITH AN ELECTRONIC SENSOR AND DISPLAY DEVICE

CLAIM OF PRIORITY

This application claims priority to U.S. Provisional Application 60/700,208 filed Jul. 18, 2005.

FIELD OF THE INVENTION

The present invention relates generally to mechanical torque wrenches. More particularly, the present invention relates to mechanical clicker type torque wrenches and a device for setting a preset torque for the wrench.

BACKGROUND OF THE INVENTION

Often, fasteners used to assemble performance critical components are tightened to a specified torque level to introduce a “pretension” in the fastener. For example, high tensile-strength steel bolts used to fasten components of military vehicles, aerospace vehicles, heavy machinery, and equipment for petrochemical operations frequently have required torque specifications. As torque is applied to the head of the fastener, eventually, beyond a certain level of applied torque the fastener actually begins to stretch. This stretching results in pretension in the fastener which then holds the joint together. Overstressing fasteners can lead to their breakage whereas under-stressing bolts can lead to joint failure, leakage, etc. Furthermore, in situations where gaskets are being utilized between the components being joined, an unequally stressed set of fasteners can result in gasket distortion and subsequent problems like leakage. Accurate and reliable torque wrenches help insure that fasteners are tightened to the proper specifications.

Torque wrenches vary from simple mechanical types to sophisticated electronic types. There are several types of mechanical torque wrenches that are routinely used to tighten fasteners to specified torque levels. Of these, clicker type mechanical torque wrenches are very popular. Clicker type mechanical torque wrenches make an audible click to let the user know when a preset torque level has been achieved and simultaneously provide a feeling of sudden torque release to the user. One example of a clicker type torque wrench includes a hollow tube in which a spring and pawl mechanism is housed. The pawl is forced against one end of a bar that extends from a drive head. The bar and drive head are pinned to the hollow tube about a pivot joint and rotate relative thereto once the preset torque level is exceeded. The preset torque level is selected by a user by causing the spring to exert either greater or lesser force on the pawl. The force acts on the bar through the pawl to resist rotation of the bar relative to the hollow tube. As the torque exerted on the fastener exceeds the preset torque value, the force tending to cause the bar to pivot relative to the hollow tube exceeds the force preventing its rotation and the pawl “trips.” When released by the action of the pawl, the bar pivots and hits the inside of the tube, thereby producing a click sound and a sudden torque release that is detectable by the user. Typically, the preset torque values to assist the user in setting the torque wrench are permanently marked on a drum type scale that is visible through a window near or on the handle, or marked on the tube itself. For most clicker type torque wrenches, the preset torque is set by rotating either an adjuster sleeve on the handle, an end cap, or a thumb screw.

Another example of a clicker type torque wrench measures the deflection of a deflectable beam relative to a non-deflectable beam, the deflectable beam causing a click once the preset torque is reached. These and other types of clicker type mechanical torque wrenches are popular since they are relatively easy to operate and make torquing relatively quick and simple. The user merely sets the preset torque value and pulls on the handle until he/she hears and feels the click and torque release indicating to the user to cease torquing the fastener.

Several drawbacks limit the usage of clicker type torque wrenches. Often, these torque wrenches have permanently marked gages that are read by the user when setting the preset torque value. These gages can be hard to read, especially when the user is occupied with torquing a fastener with smooth and continuous motion to achieve proper fastening. Some existing torque wrenches address this issue by incorporating a magnifying glass or using a separate high resolution secondary scale. Still, the size of the markings is often small and the resolution of the markings is often limited by the physical space available on the gage. As well, the lack of high resolution may prevent the user from being able to preset to a desired torque value that includes a fraction of the desired units. Furthermore, these torque wrenches are often used in hard to reach, poorly lit areas, such as under the hood of an automobile, making readings potentially even more difficult.

As well, since the drum or other type of permanently marked gage can be fairly small, the upper torquing range of clicker type torque wrenches can be limited to less than the capability of the other mechanical parts of the wrench. Furthermore, in most prior art clicker type torque wrenches, the gages are marked with only one or two sets of units (i.e. foot-pounds and Newton-meters). The user is therefore limited to these two units and anything else is normally calculated manually.

Recalibration of existing clicker type torque wrenches, especially spring type clickers, often requires disassembling the unit to replace worn out parts, which can be expensive and time consuming. Recalibration is often needed to correct the effect of the spring’s characteristics and mechanical wear that occurs over time. Often, such wear cannot be compensated for without recalibration since the gages are most often permanently printed on the handle.

The present invention recognizes and addresses the foregoing considerations, and others, of prior art constructions.

SUMMARY OF THE INVENTION

One embodiment of the present invention provides a mechanical torque wrench for engaging a workpiece, the torque wrench including a wrench body defining an elongated interior compartment and a wrench head including a workpiece engaging portion and a bar extending therefrom. The wrench head is pivotally secured to a first end of the wrench body at a pivot joint. The bar extends into the interior compartment and the workpiece engaging portion extends outwardly from the wrench body. A hand grip is located on a second end of the wrench body and a set spring is disposed within the interior compartment of the wrench body. A pawl disposed between a rear face of the bar and the set spring. A dial screw is threadably received within the interior compartment of the wrench body such that the dial screw moves along a longitudinal axis of the wrench body when rotated. Rotation of the dial screw in a first direction compresses the set spring and rotation in a second direction allows expansion of the set spring. A set ring is positioned adjacent the hand grip and is operatively connected to the dial screw and rotatable relative to the wrench body. A resistive element is operatively coupled to the dial screw and produces an output signal, the output signal being dependent on the position of the dial screw relative to the resistive element. A processor converts the output signal into an equivalent torque value that indicates a preset torque to be applied by the mechanical torque wrench to the workpiece. A user interface includes a display for displaying the equivalent torque value. Application of a torque greater than the preset torque to the workpiece causes the wrench head to pivot relative to the wrench body about the pivot joint.

Another embodiment of the present invention provides a mechanical torque wrench for engaging a workpiece, the torque wrench including a wrench body with a wrench head pivotally received therein. The wrench head includes a drive portion for engaging the workpiece and a bar extending into the interior compartment. A hand grip is located on a second end of the wrench body and a set spring disposed within the interior compartment of the wrench body. A dial screw including an annular groove formed therein is rotatably received within the interior compartment of the wrench body and rotation of the dial screw in a first direction increases force exerted on the set spring and rotation of the dial screw in a second direction decreases the force exerted on the set spring by the dial screw. A set ring is positioned adjacent the hand grip and is engageable with the dial screw and rotatable relative to the wrench body. A resistive element including a resistor and a wiper assembly is operatively coupled to the dial screw and produces an output signal that is dependent on a position of the dial screw relative to the resistive element. A processor converts the output signal into an equivalent torque value that indicates a preset torque to be applied by the mechanical torque wrench to the workpiece. A user interface includes a display for displaying the equivalent torque value and wherein application of a torque greater than the preset torque to the workpiece causes the wrench head to pivot relative to the wrench body about the pivot joint.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
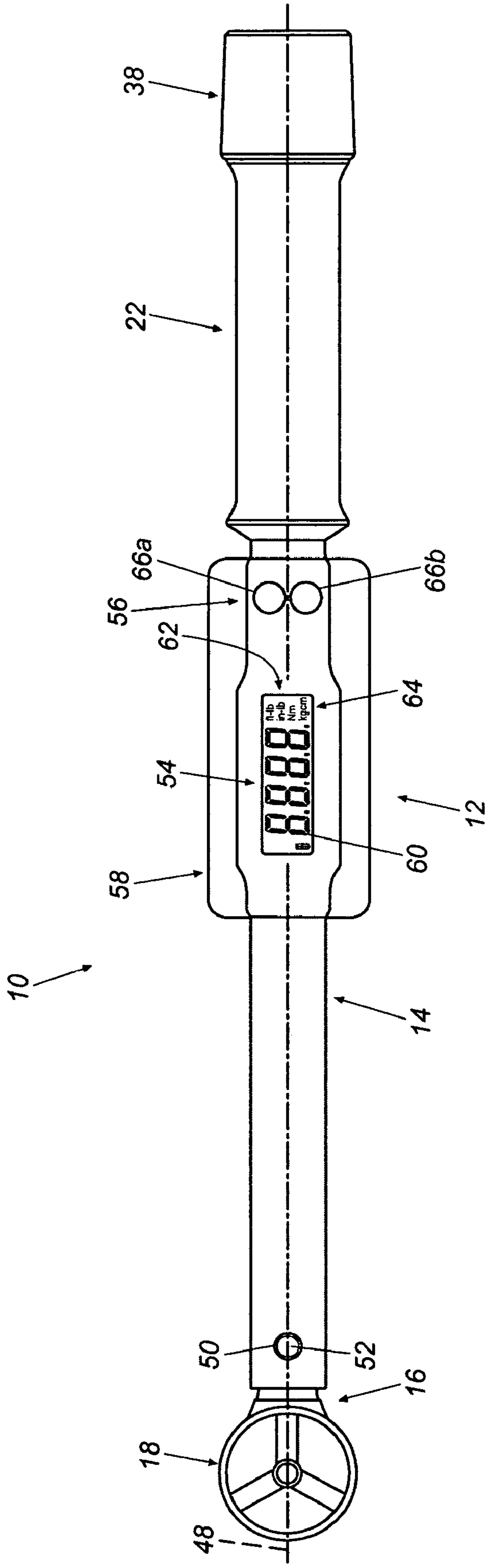
FIG. 1 is a top view of a mechanical clicker type torque wrench with an electronics unit in accordance with an embodiment of the present invention.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
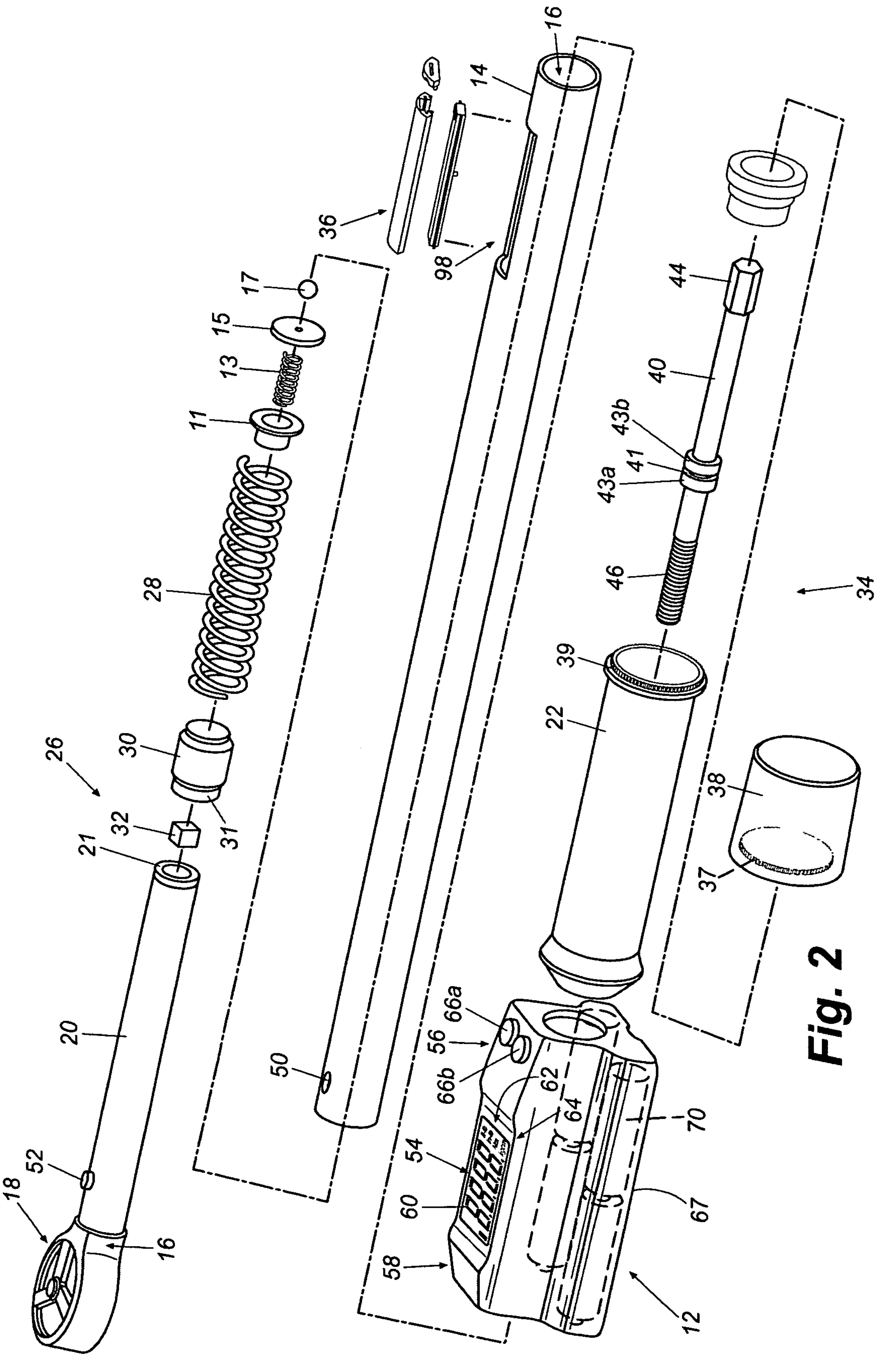
FIG. 2 is an exploded perspective view of the mechanical torque wrench as shown in FIG. 1.
Figure 5:
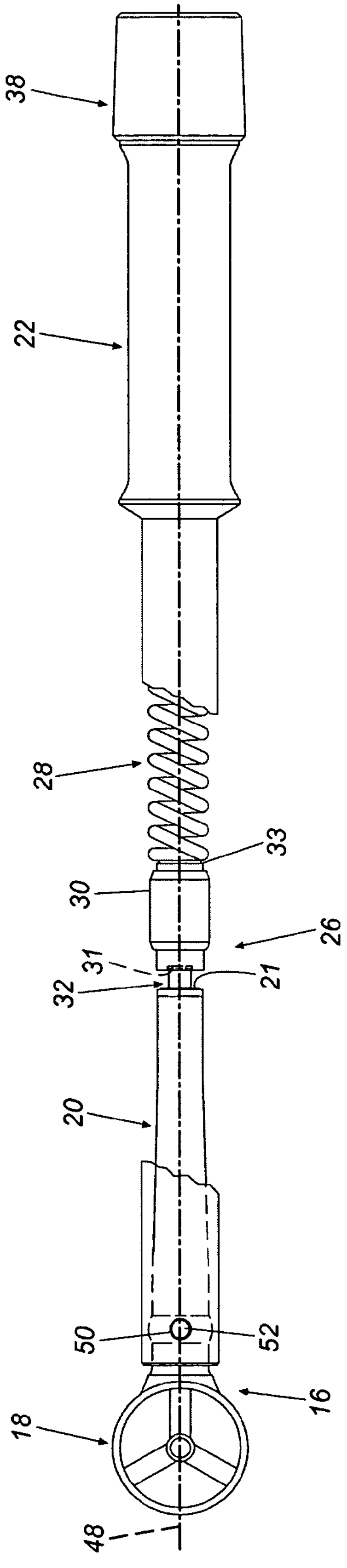
FIG. 5 is a partial cut-away top view of the mechanical torque wrench as shown in FIG. 1.

Referring now to FIGS. 1 and 2, a preferred embodiment of a mechanical clicker type torque wrench 10 with an electronics unit 12 is shown. Torque wrench 10 includes an elongated wrench body 14, a wrench head 16 including a workpiece engaging end 18 and a bar 20 extending therefrom, a hand grip 20 attached to one end of wrench body 14, and electronics unit 12, including a user interface, is received on wrench body 14 therebetween. An interior compartment 16 of wrench body 14 houses a clicker mechanism 26 that includes a set spring 28, a plug assembly 30, a pawl 32, and slender bar 20, as best seen in FIG. 5. The pawl is sandwiched between the slender bar and the spring.

An adjustment assembly 34 is disposed on wrench body 14 opposite wrench head 16 for selectively adjusting a resistive element assembly 36 mounted to wrench body 14. Adjustment assembly 34 includes an end cap 38, a dial screw 40, and a nut 42 (FIG. 6A) fixed in interior compartment 16 of wrench body 14. End cap 38 engages a first end 44 of dial screw 40 and is selectively rotatable relative to wrench body 14. A second end 46 of dial screw is threaded and engages nut 42 such that rotation of dial screw 40 causes it to move axially along a longitudinal center axis 48 of wrench body 14. A spring cap 11 is received in the back end of set spring 28 and receives an engagement spring 13 therein. A thrust washer 15 abuts the rear end of engagement spring 13 and exerts force from dial screw 40 on set spring 28 via contact with spring cap 11 when the engagement spring is fully compressed therein, as discussed in greater detail below. A ball cam 17 is positioned between a front face of dial screw 40 and thrust washer 15.

Wrench head 16 is pivotally secured to a first end of wrench body 14 such that bar 20 extends inwardly into interior compartment 16 and workpiece engaging end 18 protrudes outwardly from wrench body 14. Wrench head 16 is secured to wrench body at pivot joint 50 that includes a pivot pin 52 that is both perpendicular to longitudinal center axis 48 of wrench body 14 and transverse to a plane defined by torque wrench 10 as it is rotated during torquing operations. Preferably, workpiece engaging end 18 includes a ratchet drive (not shown) so that torque may be selectively applied to a workpiece (not shown) in either the clockwise or counterclockwise direction. Hand grip 22 is non-rotationally secured to a second end of wrench body 14.

As shown, electronics unit 12 is disposed on wrench body 14 between wrench head 16 and hand grip 22. Electronics unit 12 includes a user interface including a visual display 54, preferably a liquid crystal display, and a user input device 56 that includes a bank of buttons. Visual display 54 and input device 56 are both supported on a printed circuit board (not shown) which is in turn supported by a housing 58, preferably formed of injection molded plastic. The printed circuit board additionally carries a microcontroller and any additional electronic components for operation of the electronics unit. Visual display 54 includes a numerical display 60 to assist a user in setting a preset torque for the torque wrench, a torque unit indicator 62 that displays the units of the preset torque, and a battery level indicator 64 for displaying the condition of the batteries. As shown, input device 56 includes a power button 66*a* and a unit selector button 66*b* for choosing the units to be shown on visual display 54. Further, the housing of electronics unit 12 has a flat bottom surface 67 that forms a stable platform for setting the torque wrench down when it is not in use. The housing also defines a battery compartment 70 that is external to interior compartment of wrench body 14.

Figure 3:
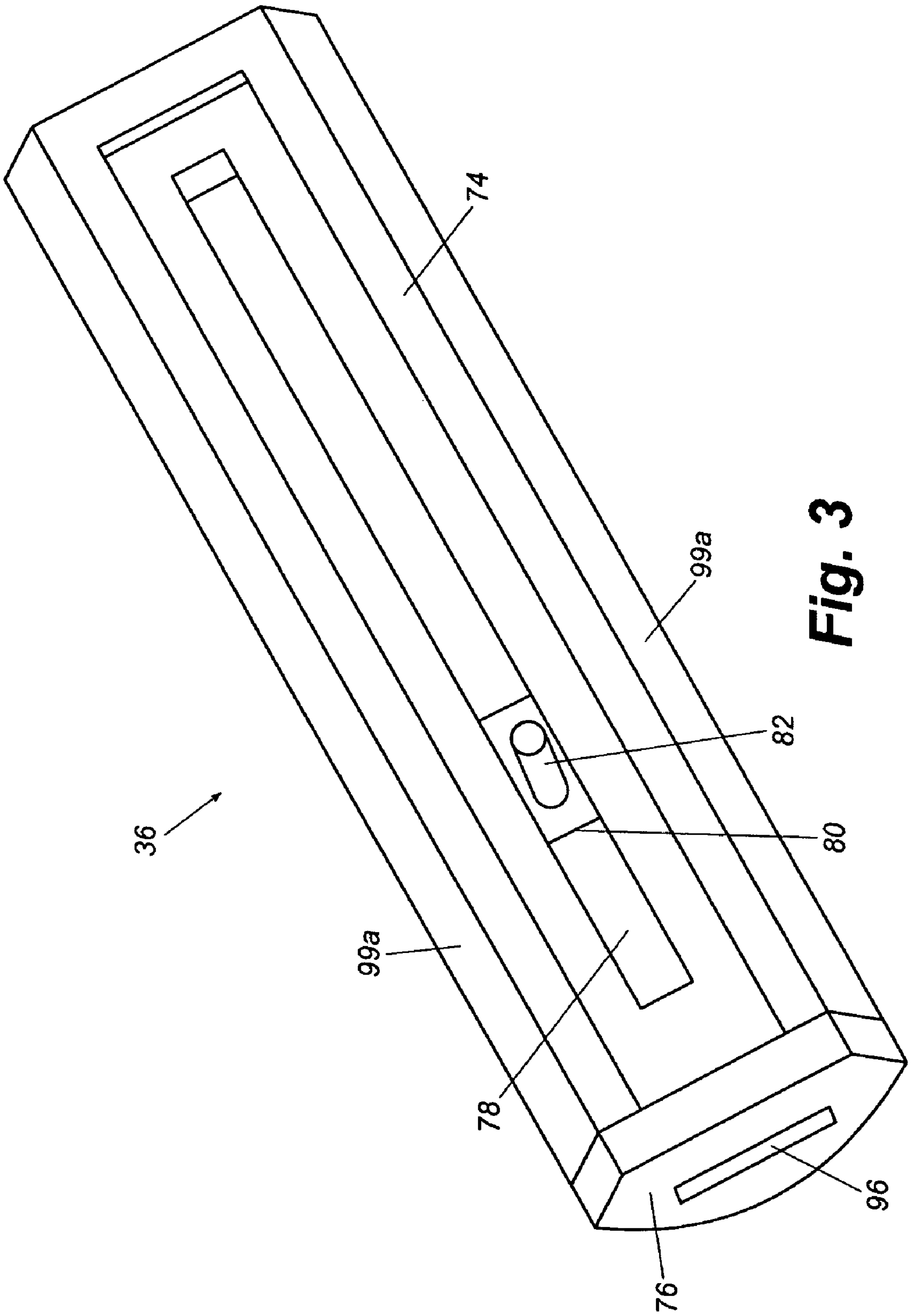
FIG. 3 is a perspective view of a resistive element assembly of the mechanical torque wrench as shown in FIG. 1.
Figure 4:
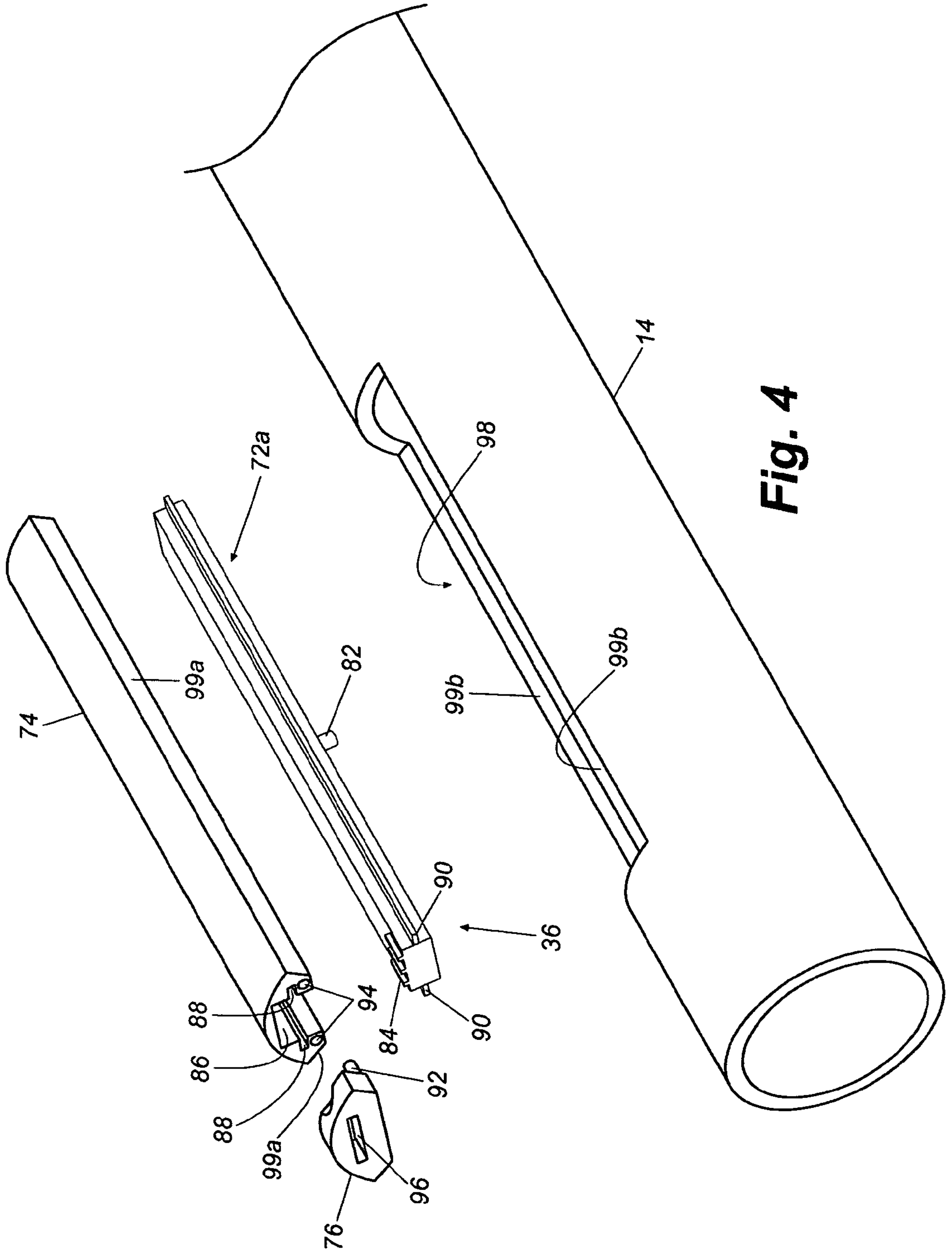
FIG. 4 is an exploded perspective view of the resistive element assembly of the mechanical torque wrench as shown in FIG. 1.

Referring now to FIGS. 3 and 4, resistive element assembly 36 includes a resistive element 72*a*, a housing 74 and an end cap 76. As shown, the resistive element is a sliding potentiometer that includes a linear resistor 78, a wiper assembly 80 configured for motion along linear resistor 78, an adjustment pin 82 extending outwardly from wiper assembly 80 and terminal leads 84 for receiving wires from electronics unit 12. Motion of wiper assembly 80 along linear resistor 78 causes the overall resistance of sliding potentiometer 72*a* to vary, as discussed in greater detail below. Sliding potentiometer 72*a* is slidably received in a central recess 86 of housing 74. Axial recesses 88 extending outwardly from central recess 86 slidably receive axial guides 90 that extend outwardly from sliding potentiometer 72*a* to insure proper positioning of the potentiometer within housing 74. After linear potentiometer 72*a* is positioned in housing 74, end cap 76 is secured to housing 74 by inserting mounting pins 92 extending from end cap 76 into pin apertures 94 formed on housing 74 in a press-fit. End cap 76 includes a lead aperture 96 that allows wires from electronics unit 12 to pass therethrough so they may be connected to terminal leads 84 on sliding potentiometer 72*a*. Once assembled, resistive element assembly 36 is mounted in an aperture 98 defined by wrench body 14. Housing 74 and aperture 98 include corresponding pairs of axially extending abutment surfaces 99*a* and 99*b*, respectively, such that when housing 74 is mounted in aperture 98, the outer surfaces of housing 74 and wrench body 14 provide a smooth cylindrical surface.

As best seen in FIG. 5, pawl 32 of clicker mechanism 26 is substantially cube-shaped and is disposed between a rear face 21 of slender bar 20 and a forward face 31 of plug assembly 30. Forward face 31 of the plug assembly is slightly recessed and has a shape similar to that of the surface of pawl 32 which rests against it. Recessed forward face 31 insures that the vertical longitudinal center axis of pawl 32 remains perpendicular to a plane defined by longitudinal center axis 48 as torque wrench 10 is rotated. As such, pawl 32 functions properly when the preset torque value is reached, as discussed in greater detail below. A rearward face 33 of plug assembly 30 receives the front end of set spring 28. Plug assembly 30 is dimensioned so that it is slidably received within interior compartment 16 of wrench body 14 yet is limited to minimal transverse motion relative to wrench body 14.

Figure 6A:
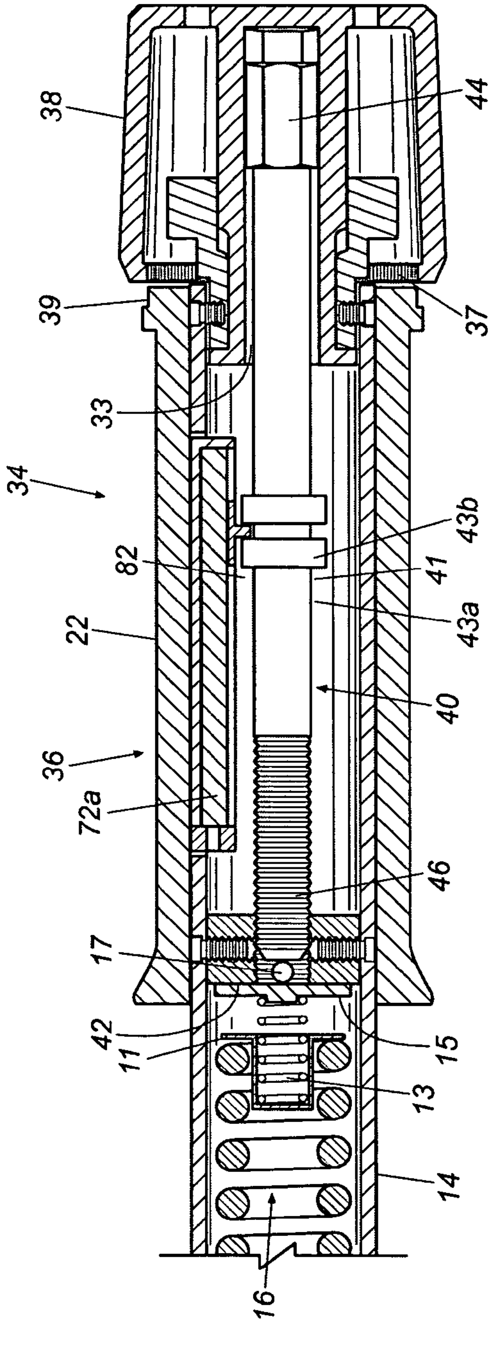
FIGS. 6A and 6B are partial cross-sectional views of the mechanical torque wrench as shown in FIG. 1, revealing the embodiment of the resistive element assembly shown in FIG. 3.
Figure 6B:
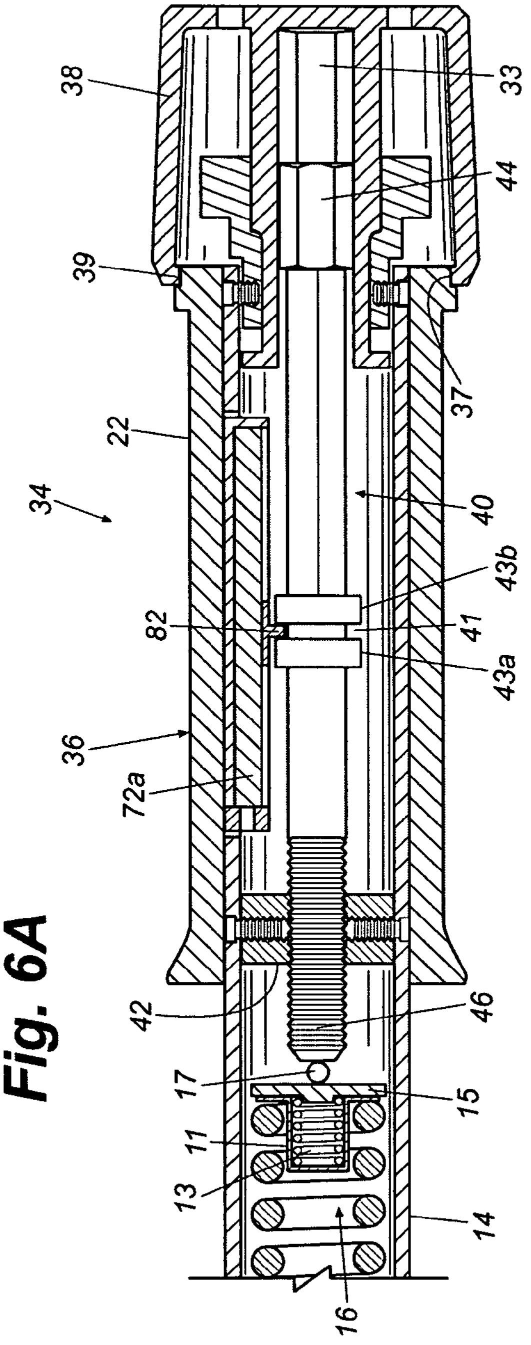

Referring now to FIGS. 6A and 6B, end cap 38 of adjustment assembly 34 is selectively rotatable relative to hand grip 22, and therefore wrench body 14. End cap 38 includes an annular array of locking teeth 39 formed about its forward inner perimeter that are selectively engageable with an annular array of locking teeth 37 formed about the rear outer periphery of hand grip 22. In a forward position (FIG. 6B) relative to hand grip 22, locking teeth 39 engage locking teeth 37 on hand grip 22, thereby rotationally fixing end cap 38 to wrench body 14. In a rearward position (FIG. 6A), locking teeth 29 are disengaged from locking teeth 37 on hand grip 22 and end cap 38 is therefore rotatable relative to wrench body 14.

End cap 38 includes an axial bore 33 that is configured to slidably receive first end 44 of dial screw 40. As shown, first end 44 of dial screw 40 and axial bore 33 include corresponding hexagonal cross-sectional shapes such that end cap 38 is non-rotatable relative to dial screw 40. Second end 46 to dial screw 40 is threaded and received by correspondingly threaded nut 42 that is rotationally fixed inside inner compartment 16 of wrench body 14. As such, rotation of end cap 38, and therefore dial screw 40, relative to wrench body 14 causes dial screw 40 to translate axially along longitudinal center axis 48 of wrench body 14. The direction of axial motion is dependent on the direction of rotation of end cap 38 and causes dial screw 40 to either increase or decrease the torque value at which pawl 32 trips.

As best seen in FIG. 6A, when dial screw 40 is in the fully retracted position, thrust washer 15 abuts threaded nut 42 and engagement spring 13 exerts a forward biasing force on set spring 28 through spring cap 11. This forward biasing force insures that pawl 32 remains properly positioned between the forward face of plug assembly 31 and the rear face of slender bar 20 (FIG. 5) when dial screw 40 is fully retracted. To preset a torque value from the fully retracted position, end cap 38 is rotated in a clockwise direction such that dial screw 40 moves toward set spring 28. In so doing, dial screw 40 urges thrust washer 15 forwardly until the thrust washer abuts spring cap 11 and engagement spring 13 is fully compressed therein. Continued rotation of end cap 38 causes thrust washer 15 to exert an increasing amount of force on set spring 28, thereby causing the amount of torque required to "trip" the torque wrench to similarly increase.

As shown, an annular groove 41 is formed about a central portion of dial screw 40 by a pair of radially outwardly extending shoulders 43*a* and 43*b*. Annular groove 41 is configured such that its fore and aft dimensions are substantially the same as the fore and aft dimensions of adjustment pin 82 of sliding potentiometer 72*a*. Annular groove 41 is configured to slidably receive adjustment pin 82 of sliding potentiometer 72*a* such that, as dial screw 40 is rotated in either direction and is translated along longitudinal center axis 48 of wrench body 14, adjustment pin 82 is engaged and moved by either radial shoulder 43*a* or 43*b* depending upon the direction of axial motion of dial screw 40 so that the overall resistance provided by the sliding potentiometer is altered. Annular groove 41 is dimensioned and configured such that minimal friction is encountered as radial shoulders 43*a* and 43*b* are rotated relative to adjustment pin 82, and adjustment pin 82 is configured to have a smooth cylindrical outer surface. As well, adjustment pin 82 is received in annular groove 41 so as to minimize unwanted vibrations that can possibly be transferred to the sliding potentiometer during use. Vibrations are also reduced since dial screw 40 is threadedly received by nut 42, and thereby immobilized with respect to the wrench body. These features help to maintain an accurate and stable display of the preset torque value on the display. Alternate embodiments of dial screw 40 may include an annular groove that extends radially inwardly into the body of dial screw 40 rather than being formed by a pair of radial solders 43*a* and 43*b*, as shown.

Figures 7A, 7B:
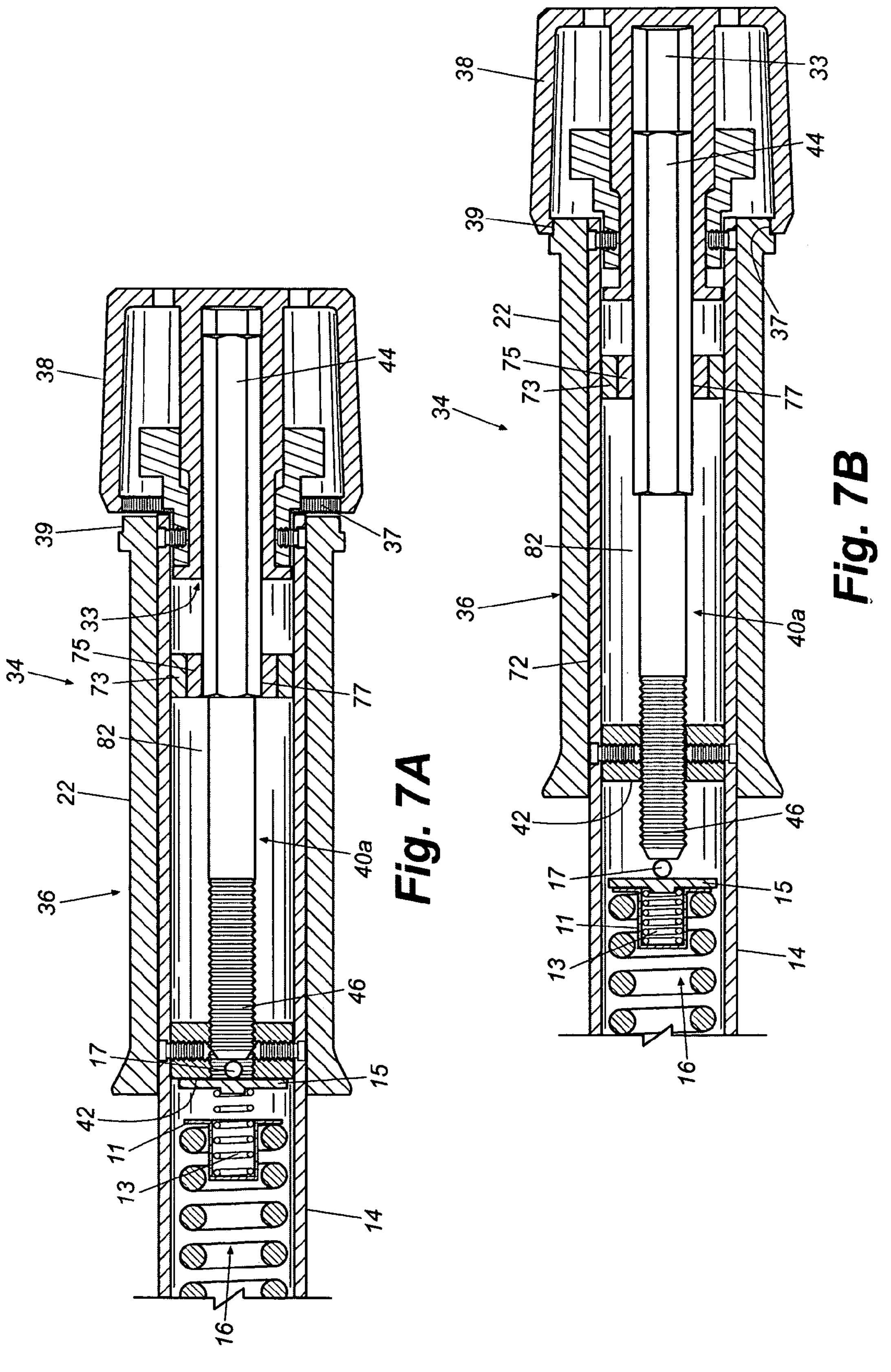
FIGS. 7A and 7B are partial cross-sectional views of the mechanical torque wrench as shown in FIG. 1, revealing an alternate embodiment of a resistive element assembly.

Referring now to FIGS. 7A and 7B, an alternate embodiment of a resistive element and dial screw is shown. The resistive element is an annular potentiometer 72*b* including an outer ring 73 that is rotationally fixed to inner compartment 16 of wrench body 14, an inner ring 75 that is rotatably secured to outer ring 73, and a central aperture 77 that is defined by inner ring 75 and configured to slidably receive a portion of dial screw 40*a*. As in the previously discussed embodiment, dial screw 40*a* includes a first end 44 having a cross-sectional shape that is complimentary to that of internal bore 33 of end cap 38, and second end 46 that is threadedly received in a nut 42 that is non-rotatably secured to interior compartment 16 of wrench body 14. However, rather than the previously discussed annular groove and adjustment pin arrangement, hexagonally shaped first portion 44 of dial screw 40*a* extends along the length of dial screw 40*a* such that it is received in the correspondingly shaped central aperture 77 of inner ring 75 of the annular potentiometer. As such, as end cap 38 is rotated relative to hand grip 22, thereby causing axial motion of dial screw 40*a* along longitudinal center axis 48 of wrench body 14, inner ring 75 of the annular potentiometer rotates relative to outer ring 73. Outer ring 73 includes a resistive element and inner ring 75 includes a wiper assembly. Rotation of inner ring 75 relative to outer ring 73 causes the overall resistance of annular potentiometer 72*b* to change, as previously discussed with respect to the sliding potentiometer.

Figure 8:
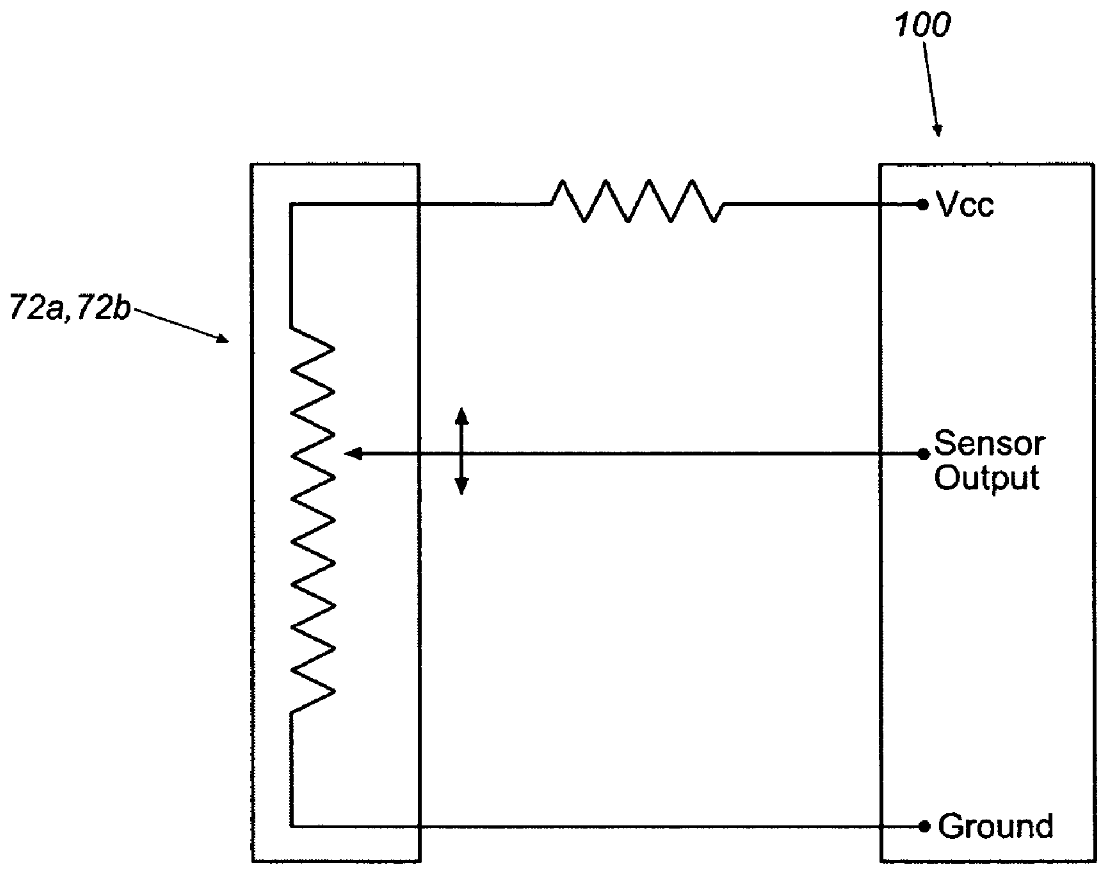
FIG. 8 is an electrical circuit of the electronics unit of the mechanical torque wrench as shown in FIG. 1.

A sensor electrical circuit 100 that determines the resistance of either sliding potentiometer 72*a* or annular potentiometer 72*b* in order to create an electrical signal for use by the microcontroller is shown in FIG. 8. Sensor electrical circuit 100 provides a fixed DC excitation voltage (Vcc) in the range of 3 to 5 volts that corresponds to a base preset torque value for the torque wrench. The voltage output of sensor electrical circuit 100 is proportional to the resistance of the potentiometer. As the dial screw of the adjustment assembly is rotated, the resistance of the potentiometer changes, which in turn changes the output voltage of the sensor electrical circuit. Because the output voltage is proportional to the resistance of the potentiometer, it is also proportional to the desired preset torque value being selected by the user.

Figure 9:
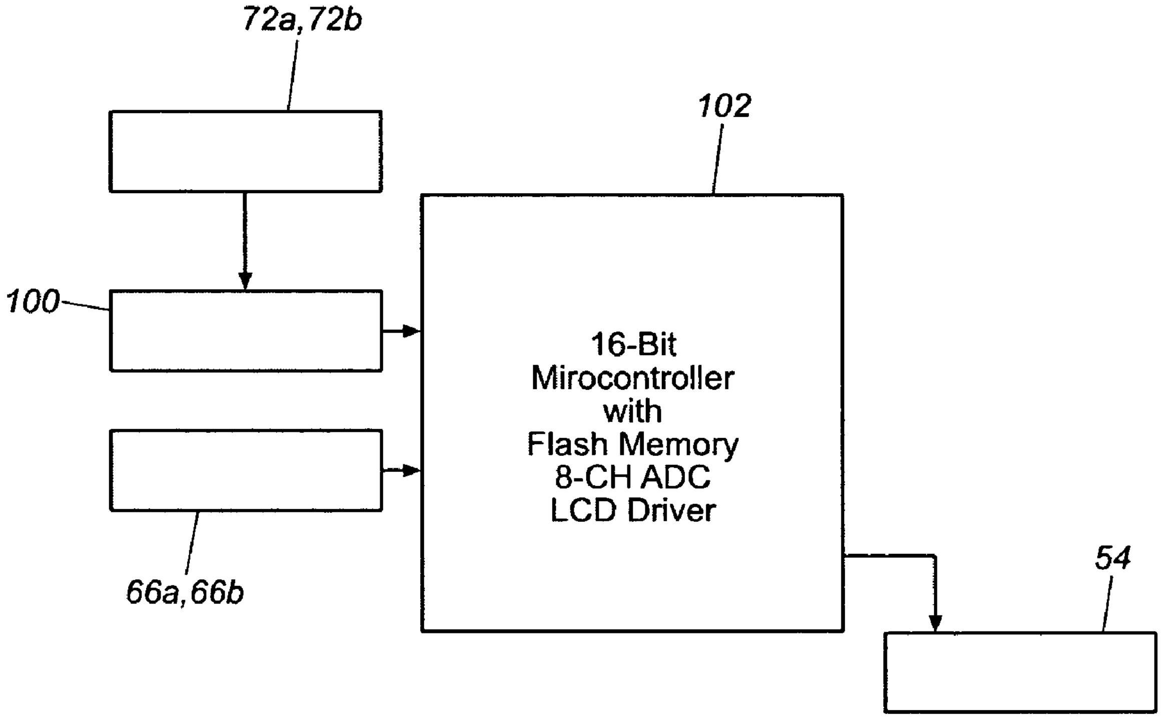
FIG. 9 is a block diagram representation of the electronics unit of the mechanical torque wrench as shown in FIG. 1.

Referring now to FIG. 9, a functional block diagram of the electronics unit of a torque wrench in accordance with the present invention is shown. The analog output from sensor electrical circuit 100 is converted to an equivalent digital value by an analog to digital converter and is then fed to a microcontroller, both residing on the same chip 102. A control algorithm 104 (FIG. 9) residing in microcontroller 102 converts the equivalent digital value into an equivalent torque value. A unit conversion algorithm converts the torque value to the units (inch-pound, foot-pound, Newton-meter or kg.cm) selected by the user via the unit selector switch. The choice of units can be increased to cover all possible units by changing the appropriate algorithms, and falls with in the scope of this invention. The resulting digital torque value is then sent to a liquid crystal display driver residing in chip 102 and the value is displayed on liquid crystal display 54. Various display technologies can be used and fall within the scope of this invention, such as utilizing bar graphs, color coded graphs, LED patterns, etc. Preferably, the LCD includes a backlight to enhance the use of the torque wrench in dark regions, such as under the hood of an automobile.

Figure 10:
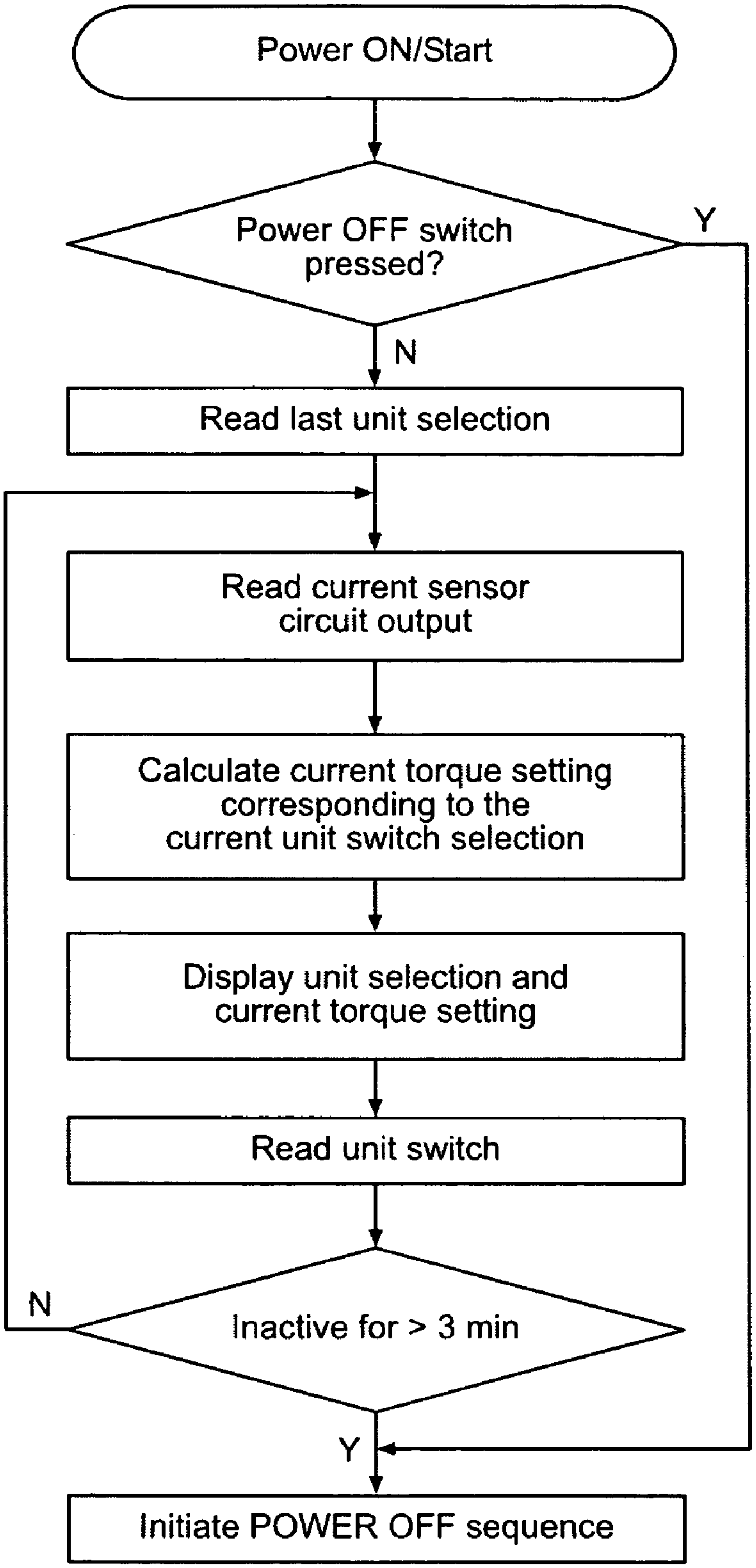
FIG. 10 is a flow chart of the control algorithm of the mechanical torque wrench as shown in FIG. 1.

Referring now to FIG. 10, the highest level functional control algorithm that controls the operations of the torque wrench is shown. To use the torque wrench, the user switches on electronics unit 12 by pressing power button 66*a*. When powered on, the electronics unit first reads the selected unit from the flash memory (saved before last powering off) and then the currently set preset torque value by virtue of reading the current sensor electrical circuit 100 output analog signal. The electronics unit converts the analog signal to a digital value that is then converted to an equivalent torque value based on the unit that was read from memory, or the unit the user may have selected with unit selector button 66*b* after powering on the wrench. The preset torque value is then displayed as well as the selected unit on the LCD. The user may now apply torque to a fastener.

The algorithm also keeps track of the activity of the torque wrench. If the wrench is inactive for a predetermined period of time, the electronics unit shuts off the power to save battery life. Preferably, a predetermined period of three minutes is used. Regardless of whether the unit is switched off by manually pressing the power button or due to an inactivity-triggered auto shutoff, the microcontroller saves the unit selected in non-volatile memory (flash memory in the preferred embodiments). This feature allows the electronic unit to come on and display the last preset torque value and selected unit.

The control system of the present invention also allows for calibration of the wrench. The unit can remain assembled and the calibration is programmed into the control algorithm software. More specifically, to initially calibrate the torque wrench, the voltage output signals of sensor electrical circuit 100 (FIG. 8) are measured for two known torque values at which the torque wrench trips, thereby indicating the desired torque has been reached. Because the values of two voltage output signals are known that correspond to two known torque values, the "slope" of the voltage output of the sensor electrical circuit versus the desired preset torque values can be calculated. The slope is then recorded into the memory on chip 102 (FIG. 9). Similarly, when the wrench needs to be recalibrated, a new slope is determined in the same manner as described above and recorded into the flash memory of the chip.

The two preferred embodiments of the mechanisms for converting the mechanical rotary dialing motion into an equivalent electrical signal described herein are for illustration purposes only. It is envisioned that other embodiments may also use optical, magnetic, or capacitance based mechanisms as position sensors for the dial screw rather than the resistance-based mechanism discussed above. For example, magnetic sensors such as magnetostriction rods with ring wipers can be used. Similarly, optical scales and laser diode readers can be used, as can capacitance sensors having two sliding grid patterns with one stationary and the other movable to change the capacitance. Furthermore, the mechanical rotary motion of a thumb wheel used in split beam type mechanical torque wrenches falls within the scope of this invention. No matter what mechanism is used to generate the rotary motion, the methodology needed to convert the rotary motion to an equivalent electrical signal does not change from what is described in this invention. These and other like mechanisms that can be used to convert a mechanical rotary motion into an equivalent electrical signal are within the scope of this invention.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A mechanical torque wrench for engaging a workpiece, comprising:

a wrench body defining an elongated interior compartment;

a wrench head including a workpiece engaging portion and a bar extending therefrom, said wrench head being pivotally secured to a first end of said wrench body at a pivot joint, said bar extending into said interior compartment and said workpiece engaging portion extending outwardly from said wrench body;

a hand grip located on a second end of said wrench body;

a set spring disposed within said interior compartment of said wrench body;

a pawl disposed between a rear face of said bar and said set spring;

a dial screw threadably received within said interior compartment of said wrench body such that said dial screw moves along a longitudinal axis of said wrench body when rotated, rotation of said dial screw in a first direction compressing said set spring and rotation in a second direction allowing expansion of said set spring;

a set ring positioned adjacent said hand grip, said set ring being operatively connected to said dial screw and rotatable relative to said wrench body;

a resistive element operatively coupled to said dial screw and producing an output signal, said output signal being dependent on a position of said dial screw relative to said resistive element;

a processor for converting said output signal into an equivalent torque value, said equivalent torque value indicating a preset torque to be applied by said mechanical torque wrench to the workpiece;

a user interface including a display for displaying said equivalent torque value; and wherein application of a torque greater than said preset torque to the workpiece causes said wrench head to pivot relative to said wrench body about said pivot joint.

2. The mechanical torque wrench of claim 1, said resistive element further comprising a potentiometer fixed to said interior compartment of said wrench body.

3. The mechanical torque wrench of claim 2, said potentiometer further comprising a sliding potentiometer including a resistor and a wiper assembly, wherein movement of said dial screw along said longitudinal axis of said wrench body similarly moves said wiper assembly along said resistor such that said output signal is altered.

4. The mechanical torque wrench of claim 3, wherein:

said dial screw includes an annular groove;

said wiper assembly includes a pin extending outwardly therefrom, said pin being slidably received in said annular groove such that said dial screw is rotatable relative to said wiper assembly; and rotation of said dial screw moves said wiper assembly relative to said resistor.

5. The mechanical torque wrench of claim 4, wherein said annular groove is formed by a first and a second radially extending shoulder, said first and second radially extending shoulders being parallel to each other.

6. The mechanical torque wrench of claim 2, further comprising a plug assembly disposed between said pawl and said set spring, said pawl being adjacent a front face of said plug assembly and said rear face of said bar, said pawl being pivotal relative to said rear face and said front face.

7. The mechanical torque wrench of claim 2, said potentiometer further comprising an annular potentiometer including a stationary outer ring and an inner ring rotatably secured to said outer ring, wherein rotation of said dial screw causes rotation of said inner ring relative to said outer ring such that said output signal is changed.

8. The mechanical torque wrench of claim 7, wherein:

said outer ring includes a resistor;

said inner ring includes a wiper assembly and includes a central aperture formed therein; and wherein said dial screw is slidably received in said central aperture and rotation of said dial screw causes said wiper assembly to move relative to said resistor.

9. The mechanical torque wrench of claim 8, wherein said central aperture and a portion of said dial screw received therein are polygonally shaped.

10. The mechanical torque wrench of claim 2, wherein rotation of said wrench head about said pivot joint causes said bar to strike said wrench body.

11. The mechanical torque wrench of claim 2, wherein said workpiece engaging portion of said wrench head is a ratchet drive.

12. The mechanical torque wrench of claim 2, wherein said wrench body is tubular.

13. The mechanical torque wrench of claim 2, wherein said set ring is axially movable between a first position in which said set ring is rotatable about said wrench body and a second position in which said set ring is rotationally fixed to said wrench body.

14. The mechanical torque wrench of claim 2, wherein said display is a liquid crystal display.

15. The mechanical torque wrench of claim 10, wherein said liquid crystal display includes a preset torque indicator and a torque unit indicator.

16. The mechanical torque wrench of claim 15, wherein said user interface further includes a unit selection switch to allow a user to select a system of units for display in said torque unit indicator.

17. A mechanical torque wrench for engaging a workpiece comprising:

a wrench body defining an elongated interior compartment;

a wrench head pivotally received in said interior compartment, said wrench head including a drive portion for engaging the workpiece and a bar extending into said interior compartment;

a hand grip located on a second end of said wrench body;

a set spring disposed within said interior compartment of said wrench body;

a dial screw including an annular groove formed therein, said dial screw being rotatably received within said interior compartment of said wrench body, rotation of said dial screw in a first direction increasing force exerted on said set spring and rotation of said dial screw in a second direction decreasing force exerted on said set spring by said dial screw;

a set ring positioned adjacent said hand grip, said set ring being engageable with said dial screw and rotatable relative to said wrench body;

a resistive element including a resistor and a wiper assembly, said wiper assembly being operatively coupled to said annular groove of said dial screw, said resistive element producing an output signal that is related to a position of said dial screw relative to said resistive element;

a processor for converting said output signal into an equivalent torque value, said equivalent torque value indicating a preset torque to be applied by said mechanical torque wrench to the workpiece;

a user interface including a display for displaying said equivalent torque value; and wherein application of a torque greater than said preset torque to the workpiece causes said wrench head to pivot relative to said wrench body about said pivot joint.

18. The mechanical torque wrench of claim 17, said resistive element further comprising a potentiometer fixed to said interior compartment of said wrench body.

19. The mechanical torque wrench of claim 18, said potentiometer further comprising a sliding potentiometer including a resistor and a wiper assembly, wherein movement of said dial screw along a longitudinal axis of said wrench body similarly moves said wiper assembly along said resistor such that said output signal is altered.

* * * * *